United States Patent [19]

Takemoto et al.

[11] Patent Number: 4,996,555
[45] Date of Patent: Feb. 26, 1991

[54] OPTICAL SYSTEM FOR USE WITH A VIEWFINDER

[75] Inventors: Satoru Takemoto; Rokusaburo Kaneko; Matsuyuki Miwa; Seiji Makino, all of Kanagawa, Japan

[73] Assignee: Fuji Photo Film Co., Ltd., Kanagawa, Japan

[21] Appl. No.: 464,063

[22] Filed: Jan. 12, 1990

[30] Foreign Application Priority Data

Jan. 13, 1989 [JP] Japan ............................ 1-6757
Jun. 9, 1989 [JP] Japan .......................... 1-147165
Nov. 22, 1989 [JP] Japan ......................... 1-304486

[51] Int. Cl.⁵ .............................................. G03B 13/24
[52] U.S. Cl. ...................................................... 355/44
[58] Field of Search .................. 355/44, 45, 68, 38, 355/41, 27–28

[56] References Cited

U.S. PATENT DOCUMENTS 3,768,903 10/1973 Steinberger et al. ................. 355/41
4,080,061 3/1978 von Stein et al. ..................... 355/38
4,727,399 2/1988 Matsumoto ........................... 355/41

FOREIGN PATENT DOCUMENTS 61-5135 2/1986 Japan .

Primary Examiner—L. T. Hix
Assistant Examiner—Khanh Dang
Attorney, Agent, or Firm—Sughrue, Mion, Zinn, Macpeak & Seas

[57] ABSTRACT

A film carrier is provided with a film viewing window formed therein and a loop forming device between the film viewing window and a film exposing window. Prior to printing, a film is inspected through the film viewing window to input position and exposure correction data for each frame of the film. The film is adjusted automatically in position in the film exposing window according to the position correction data. At the film exposure window the inspected film is subjected by a scanner only to measuring (to find an exposure) and exposing. To print a half size of 135 film in place of a full size of 135 film, the film carrier is turned 90°, directing the half size of the frame in the same direction as the full size frame and placing the film viewing window on the side of an operator.

20 Claims, 12 Drawing Sheets

F I G. 7
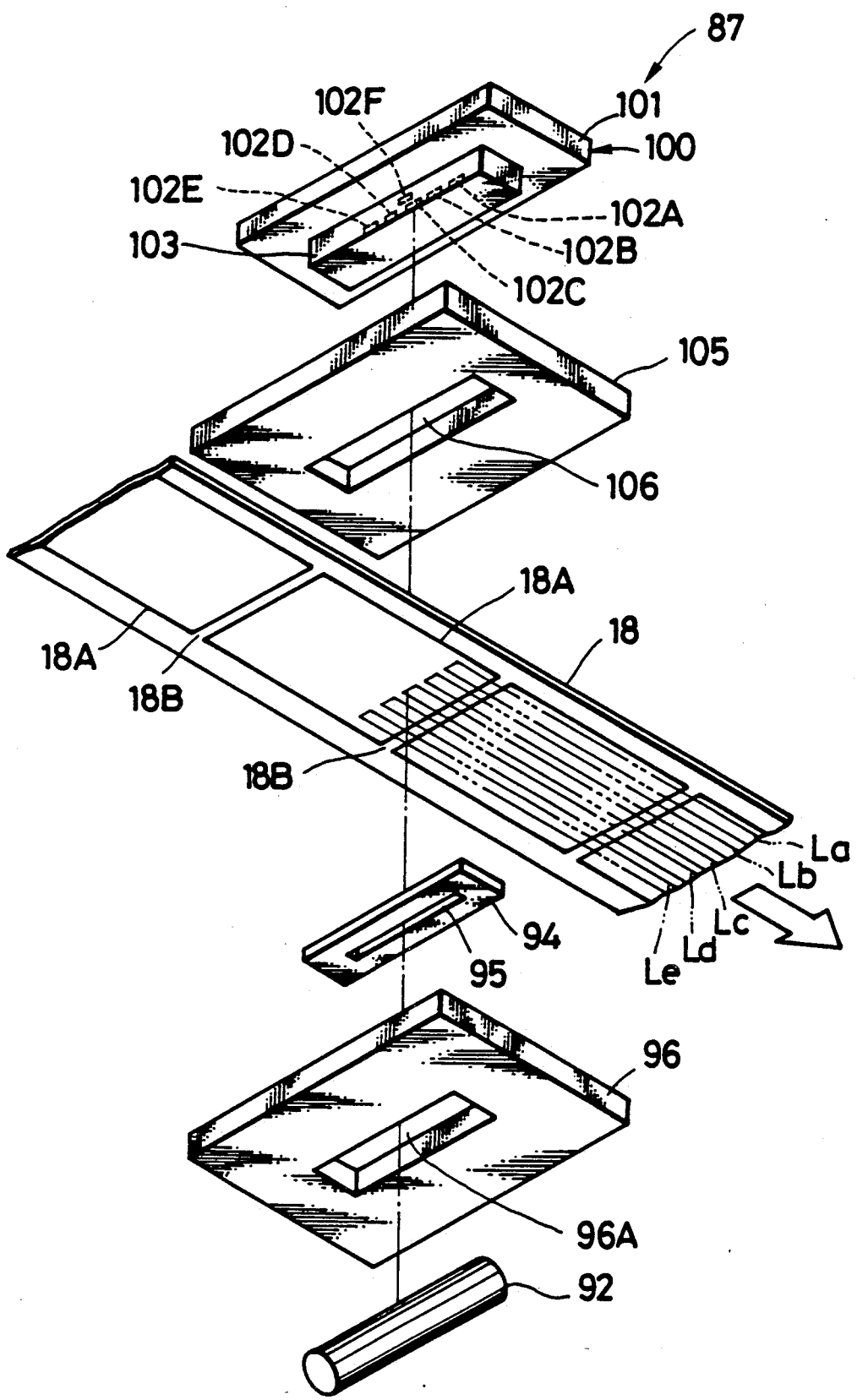

FIG. 8A
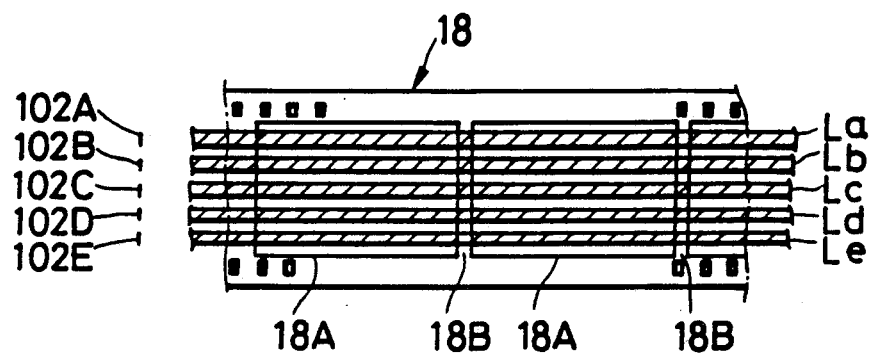
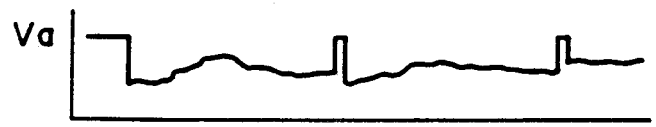
FIG. 8B  Va
FIG. 8C  Vb
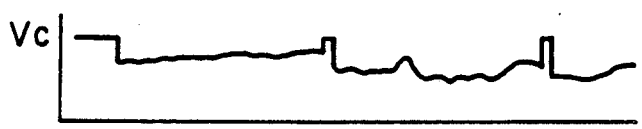
FIG. 8D  Vc
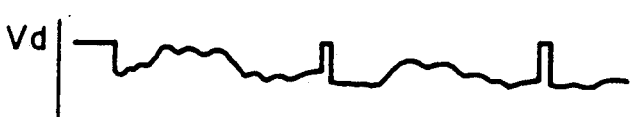
FIG. 8E  Vd
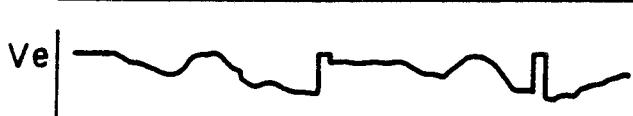
FIG. 8F  Ve
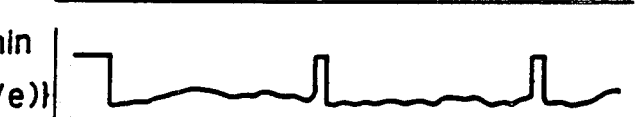
FIG. 8G  Vmin
{=MIN(Va,Vb,Vc,Vd,Ve)}
FIG. 8H  Vmax
{=MAX(Va,Vb,Vc,Vd,Ve)}
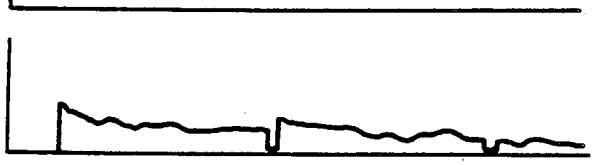
FIG. 8I
(Vmax − Vmin)

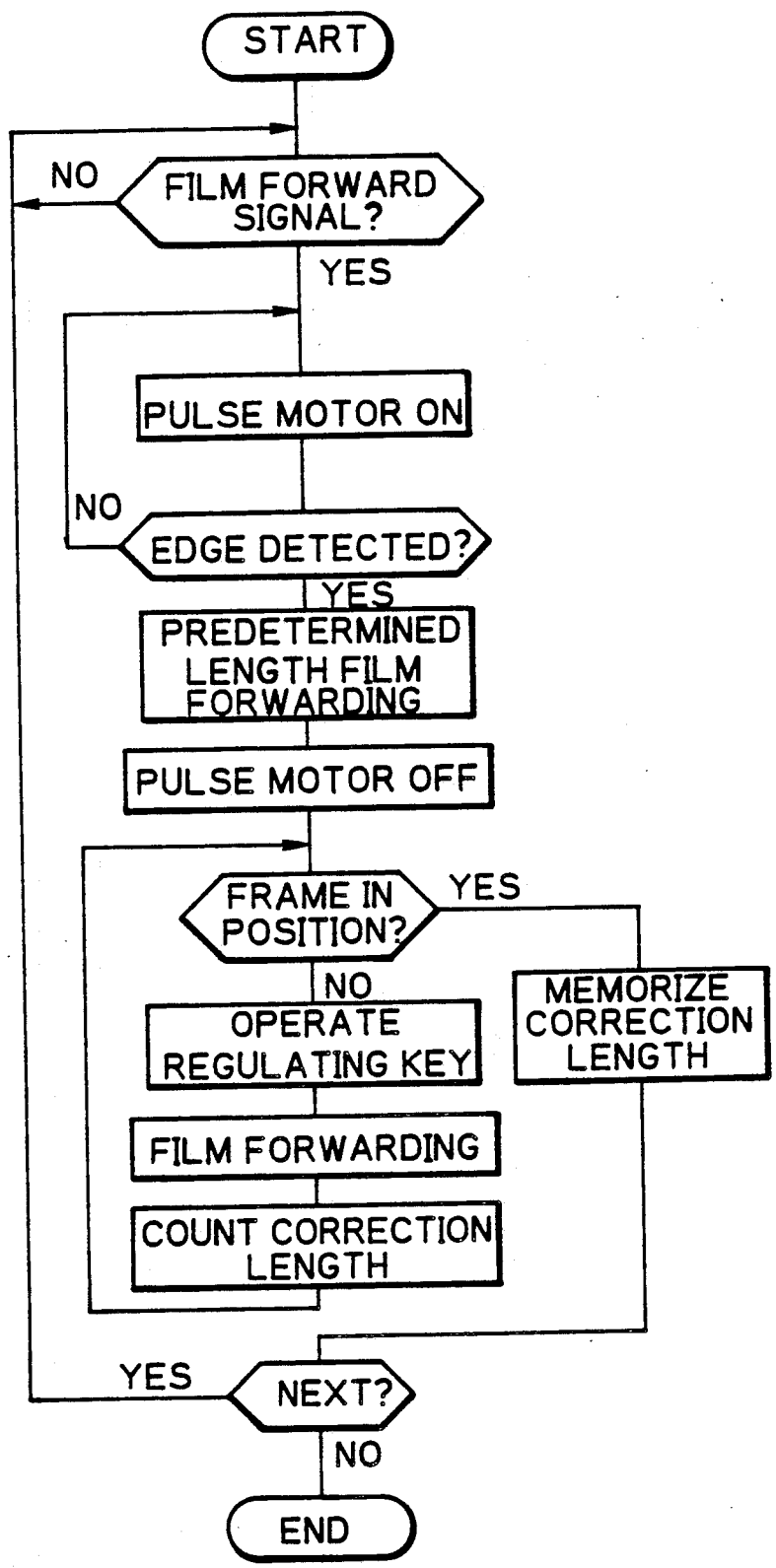

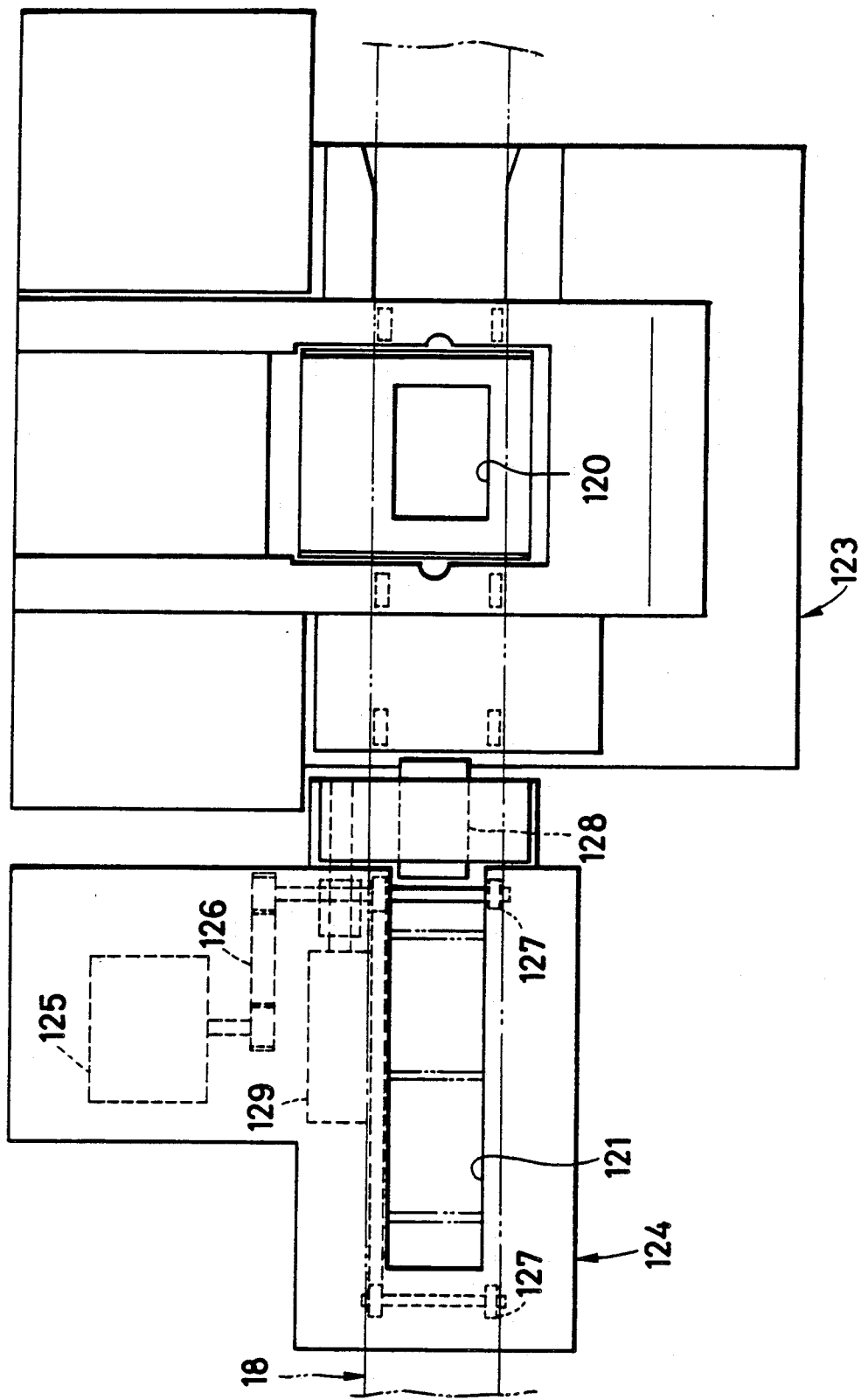

OPTICAL SYSTEM FOR USE WITH A VIEWFINDER

BACKGROUND OF THE INVENTION

The present invention relates to a photographic film carrier and more particularly to a film carrier of a photographic printer in which a negative film is inspected prior to making prints therefrom.

Color printers generally are provided with automatic exposure control systems which draw out at least one characteristic value of a color image of a negative film and calculate a printing exposure color by color, substituting the characteristic value in an exposure calculating formula. Practically an exposure control value having a certain relationship relative to the printing exposure is calculated by color so as to automatically control each printing light color component (red, green and blue).

Because negative films include various scenes, it becomes difficult to make favorable prints from all negative films. For this reason, it is customary to inspect negative films prior to making prints therefrom to determine an exposure correction value for an unusual scene image which is expected to provide an unfavorable print when automatic exposure control is used. The determination of exposure correction value is made based on an operator's experience.

Although it is convenient to use a special negative film inspection apparatus when inspecting a large number of negative films, for making prints from a small number of negative films it is normal to inspect visually negative films placed in an exposing position on a frame by frame basis prior to making prints therefrom. However, visual inspection of images placed in exposure positions one at a time is time-consuming resulting in decreased printing efficiency.

Film carriers for automatically placing a negative film in the exposure position generally are provided with automatic film forwarding mechanisms, such as detecting notches attached to respective frames of the negative film for placing each frame in the exposure position or using a frame sensor for detecting frames to place each frame in the exposing position automatically. The automatic film forwarding mechanism which detects notches has a problem in that each negative film is to be attached with notches corresponding accurately to frames of the negative film. With the other mechanism which uses a frame or edge sensor, it is difficult to detect a frame if the frame has an unclear edge. For these reasons, conventional automatic film forwarding mechanisms cannot place a negative film accurately in the exposure position.

SUMMARY OF THE INVENTION

In view of the foregoing, it is a primary object of the present invention to provide a photographic film carrier which enables simultaneous performance of film inspection and printing exposure with high efficiency.

It is another object of the present invention to provide a photographic film carrier which makes it possible to make prints from both half and full sizes of 135 negative films with high efficiency.

It is still another object of the present invention to provide a photographic film carrier which enables accurate and automatic placement of frames, even those having an unclear edge, in an exposure position.

The foregoing and other objects of the present invention are achieved by providing a photographic film carrier, used together with a photographic printer, for defining a film exposure window. The film carrier is provided with a film exposure window through which the film is exposed for printing; a film viewing window, formed close to the film exposure window, for allowing an operator to inspect each frame placed therein for position and exposure; and looping structure, disposed between the film viewing window and film exposing window, for forming a loop in the negative film between the film viewing window and film exposing window. It is desirable to form the film exposing window the film viewing window, and the looping structure integrally with the film carrier.

The integral film carrier preferably is supported by a turning device for rotating the carrier through 90° about an axis passing through the center of the film exposing window so as to direct the film viewing window toward the operator who inspects each frame when the photographic film carrier is turned through 90°.

The film carrier is associated with first and second frame sensors disposed close to, and on upstream sides of, the film viewing window and film exposing window, respectively for detecting a front edge of each frame, the first and second frame sensors having the same structure and operation. First and second film forwarding devices are provided independently in association with the film viewing window and film exposing window, respectively, for automatically positioning each frame in the film viewing window and film exposing window based on outputs from the first and second frame sensors, respectively.

An input device inputs correction data for each frame forwarded by the first film forwarding device positioned in the film viewing window as a result of the visual inspection of each frame by the operator. A first position correcting device corrects each frame positioned in the film viewing window according to the data input through the input device. A second positioning device stores data from the input device and corrects each frame positioned in the film exposure window according to the data and an output from the second frame sensor. The first and second film forwarding devices have the same structure and operation.

According to the present invention, because the looping device forms a loop in the film between the film viewing window and film exposing window, it is not necessary to inspect a frame placed in an exposing window as in conventional printers. Film inspection and exposure are effected simultaneously for both full size and half size films, resulting in improved printing efficiency.

Because the film carrier turning device turns the film carrier through 90° about the printing axis so as to place the film viewing window on the side of the operator, it is possible not only to inspect the half size film easily but also to print an image of a half size film on a photographic paper in which images of a full size film are printed, without changing the position of the photographic paper.

The film carrier is provided with the first and second frame sensors disposed close to, and on upstream sides of, the film viewing window and film exposing window, respectively, for detecting a front edge of each frame, the first and second frame sensors having the same structure and operation. The first and second film forwarding devices are provided independently in association with the film viewing window and the film exposing window, respectively, for automatically positioning each frame in the film viewing window and film exposing window based on outputs from the first and second frame sensors, respectively, the first and second film forwarding devices having the same structure and operation. Data for correcting the position of each frame forwarded by the first film forwarding device positioned in the film viewing window are input as a result of the visual inspection of each frame by the operator. Accordingly, the film is placed automatically in a proper position in the film exposing window. This avoids the necessity of checking the positions of frames of the film in the exposing window, making exposure more sure and efficient if an automatic exposure is conducted.

BRIEF DESCRIPTION OF THE DRAWINGS

The above and other objects and features of the present invention will be apparent to those skilled in the art from reading the following description of a preferred embodiment when taken in conjunction with the appended drawings, in which:

FIG. 7 is an exploded perspective view of the frame sensor;

FIGS. 8A-8I are an explanatory view showing a negative film and graphs of signals from various sensors which scan a frame of the negative film;

FIG. 9 is a flow chart showing a sequence for automatically a film in a viewing window;

FIG. 12 is a plan view of a film carrier according to another preferred embodiment of the present invention.

DETAILED DESCRIPTION OF THE PREFERRED EMBODIMENTS

Figure 1:
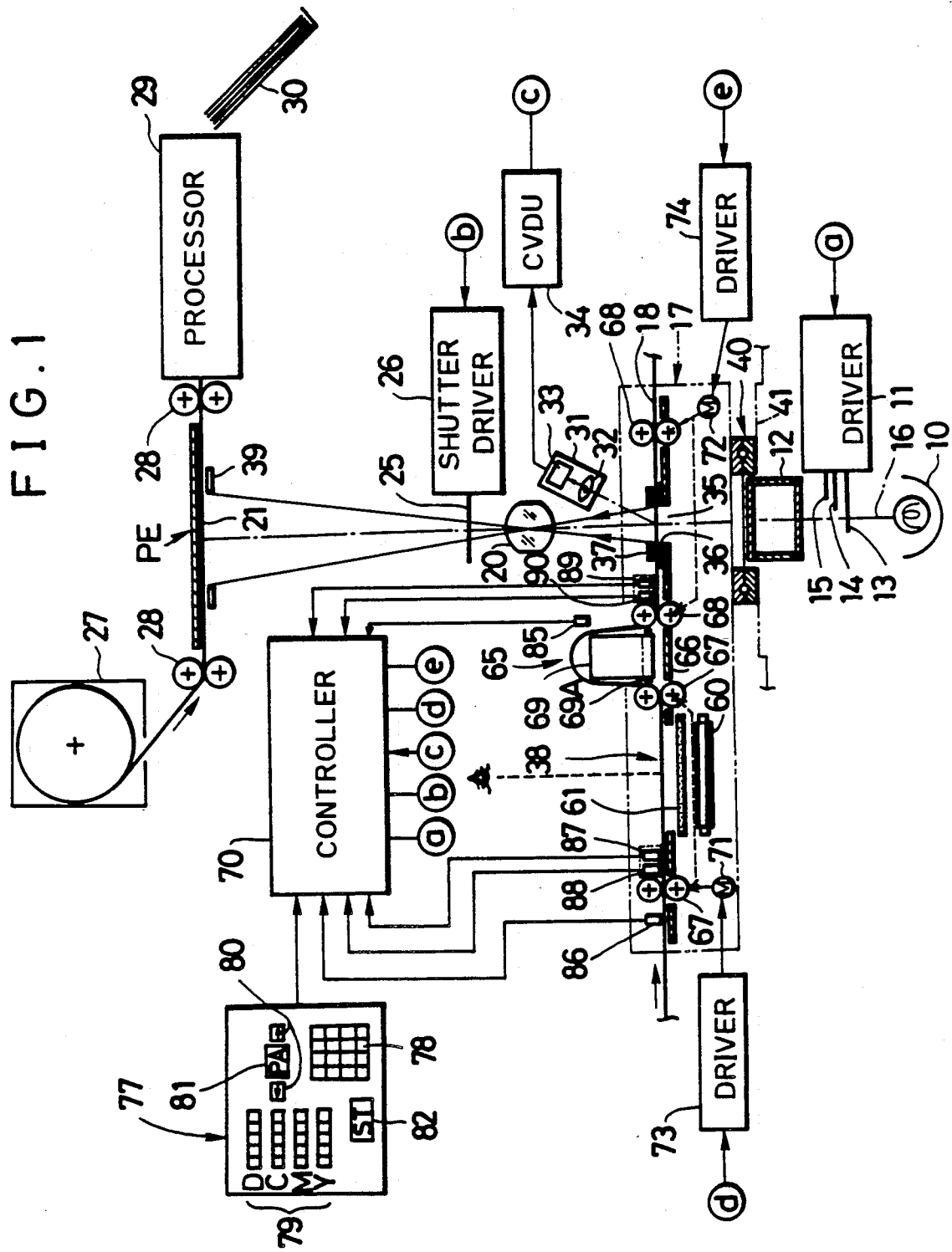
FIG. 1 a schematic view, partly in block, of a printer-processor in which a film carrier in accordance with a preferred embodiment of the present invention is used.

FIG. 1 shows a photographic printer in which a film carrier according to a preferred embodiment of the present invention is used. The printer includes a lamp 10, and a mirror box 12 which comprises a square hollow tube having inner mirrored walls and top and bottom diffusion plates. Interposed between the lamp 10 and the mirror box 12 are cyan, magenta and yellow complementary color filters 13, 14 and 15 for regulating the proportion of the three color components of light so as to control light quality. Each color filter 13, 14, 15 is controlled so to be automatically inserted, independently of the other two, into a printing path 16 by means of a filter driver 11 according to three color exposures. The white light from the lamp 10 passes through the color filter 13, 14 or 15 into the mirror box 12 and thus is diffused. After passing through a color original or color negative film 18 held by a film carrier apparatus 17, the diffused light is focused on a color photographic paper 21 by means of a printing lens 20 to create a latent image of the negative film 18 under control of a shutter 25 which is controlled by a shutter driver 26 to open for a certain time. The color photographic paper 18, which is rolled in a magazine 27, is withdrawn one frame at a time by a pair of withdrawing rollers 28 which are actuated by an electric motor (not shown) to place an unexposed part thereof in a printing station P defined by a paper framing mask 39. After being developed in a well known photographic processor 29, the exposed part of the color paper 21 is cut into individual prints and delivered into a tray 30.

Located above the film carrier apparatus 17, there is an image scanner 31 comprising a lens 32 and a color image area sensor 33, such as a CCD array, to detect light passed through a great number of points of the negative film 13 in a three color separating method that is well known in the art. Outputs from the image scanner 31 are sent separately by color to a characteristic value drawing unit (CVDU) 34 in order automatically to obtain characteristic values for three colors of each frame of the color negative film 18, which in turn are transmitted as exposure correction data to a controller 70. The characteristic value drawing unit 34, which comprises a well known general use microcomputer, automatically calculates exposure correction values for three colors, red, green and blue, based on the outputs from the image scanner 31.

The film carrier apparatus 17 is provided with a film exposing window 35 and a film viewing window 38. The film exposing window 35 comprises a film framing mask 36 and a film pressure mask 37. Two types of masks, for a full size 135 film and a half size 135 film, respectively, are prepared for the film framing mask 36, and are attached selectively to the film carrier apparatus 17. The film pressure mask 37 is depressed against the film framing mask 36 by a solenoid (not shown) so as to keep the negative film 18 flat between the film framing mask 36 and the film pressure mask 37 when an exposure is made. After exposure, the solenoid is deenergized so as to allow the negative film 18 to be moved smoothly between the film framing mask 36 and the film pressure mask 37.

Figure 4:
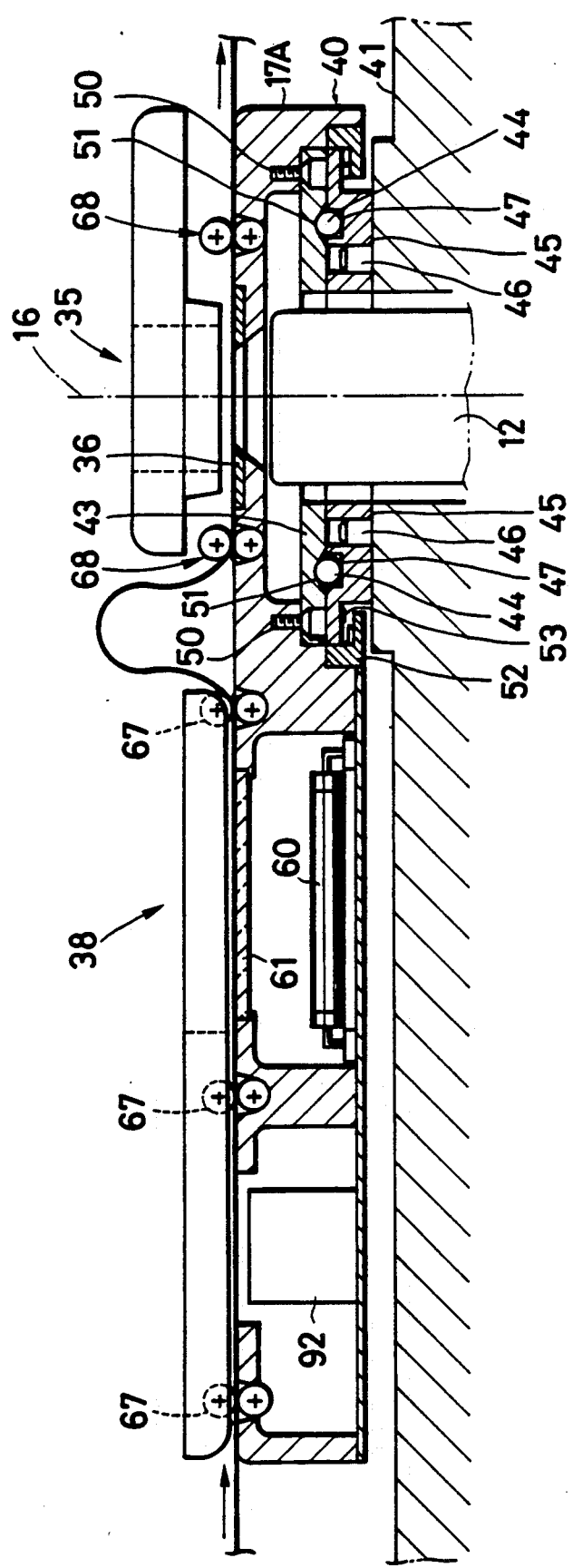
FIG. 4 is a vertical sectional view of the film carrier of FIG. 1 showing a turntable unit.
Figure 5:
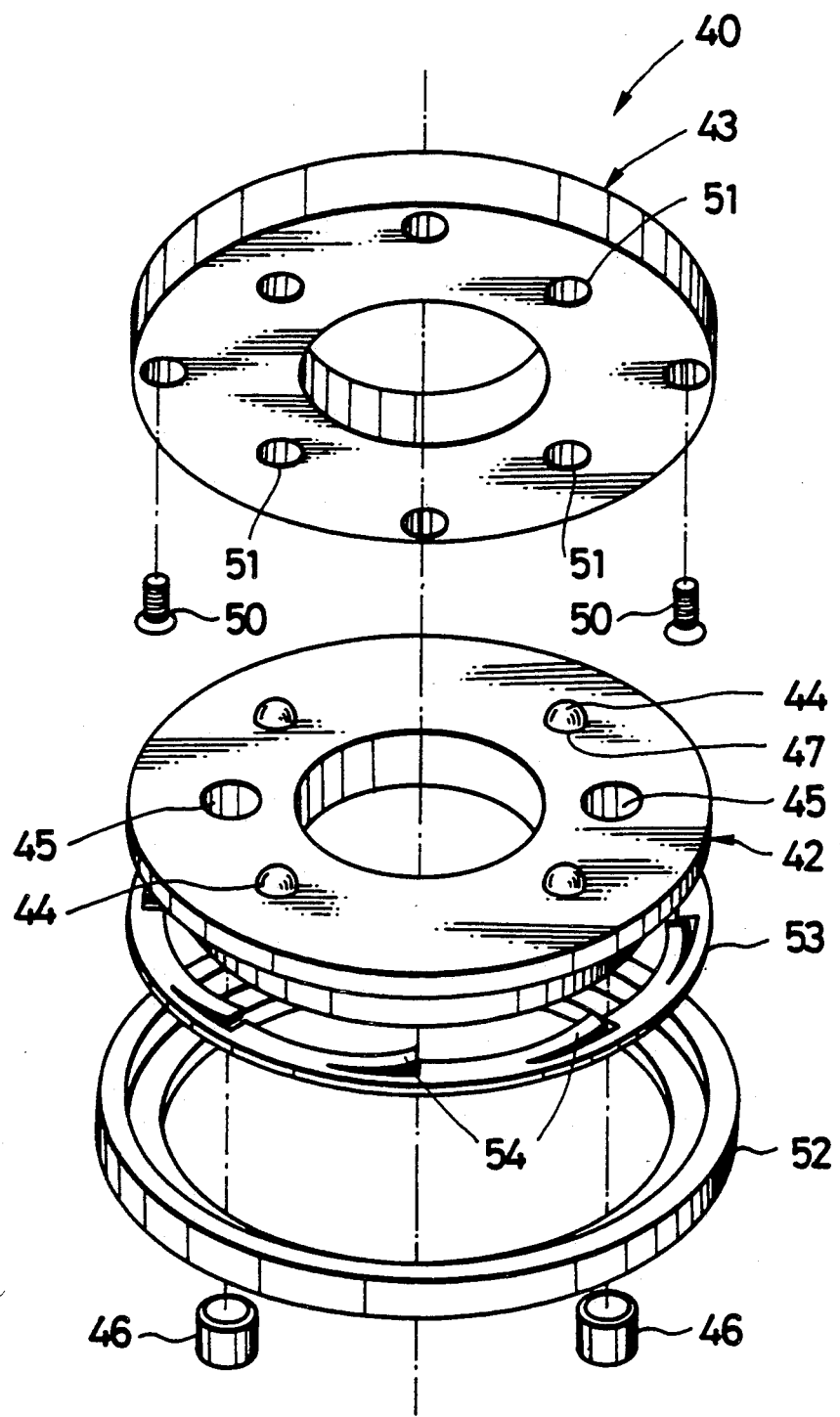
FIG. 5 is an exploded perspective view of the turntable unit of FIG. 4.

The film carrier apparatus 17 is mounted on a turntable 40 disposed on a working table 41 of the printer so as to turn through 90° about the axis of the printing path 16 which passes the center of the film exposing window 35. As shown in FIGS. 4 and 5, the turntable unit 40 comprises a base table 42 and a turntable 43 supported for rotation by means of a plurality of click stop positioning steel balls 44 (for example, four in this embodiment) received in the base table 42. The base table 42 is formed in the upper surface with two positioning holes 45 located diametrically opposite each other. Two positioning pins 46 secured to the working table 41 fit into the positioning holes 45, thereby positioning the film carrier apparatus 17 so as to align the film exposing window 35 with the paper mask 39 of the printer. The base table 42 is also formed in the upper surface with four ball receiving recesses 47 at regular angular spacings or at regular angles of 90°. Each ball receiving recess 47 receives therein a lower half of the click stop positioning steel ball 44.

The turntable 43 is secured to one end portion 17A of the film carrier apparatus 17 with set screws 50. The turntable 43 is formed in the undersurface thereof with conical recesses 51 aligned with the ball receiving holes 47 of the base table 42, respectively. The base table 42 is mounted rotatably on the portion 17A of the film carrier apparatus 17 by means of an annular fitting ring 52. A spring ring is disposed between the fitting ring 52 and base table 42 for urging the base table 42 against the turntable 43. As shown in FIG. 5, the spring ring 53 is provided with a plurality of spring leaves 54 integrally formed therewith at regular angular spacings. The spring ring 53 may be replaced with any well known spring members, such as a coil spring.

Figure 2:
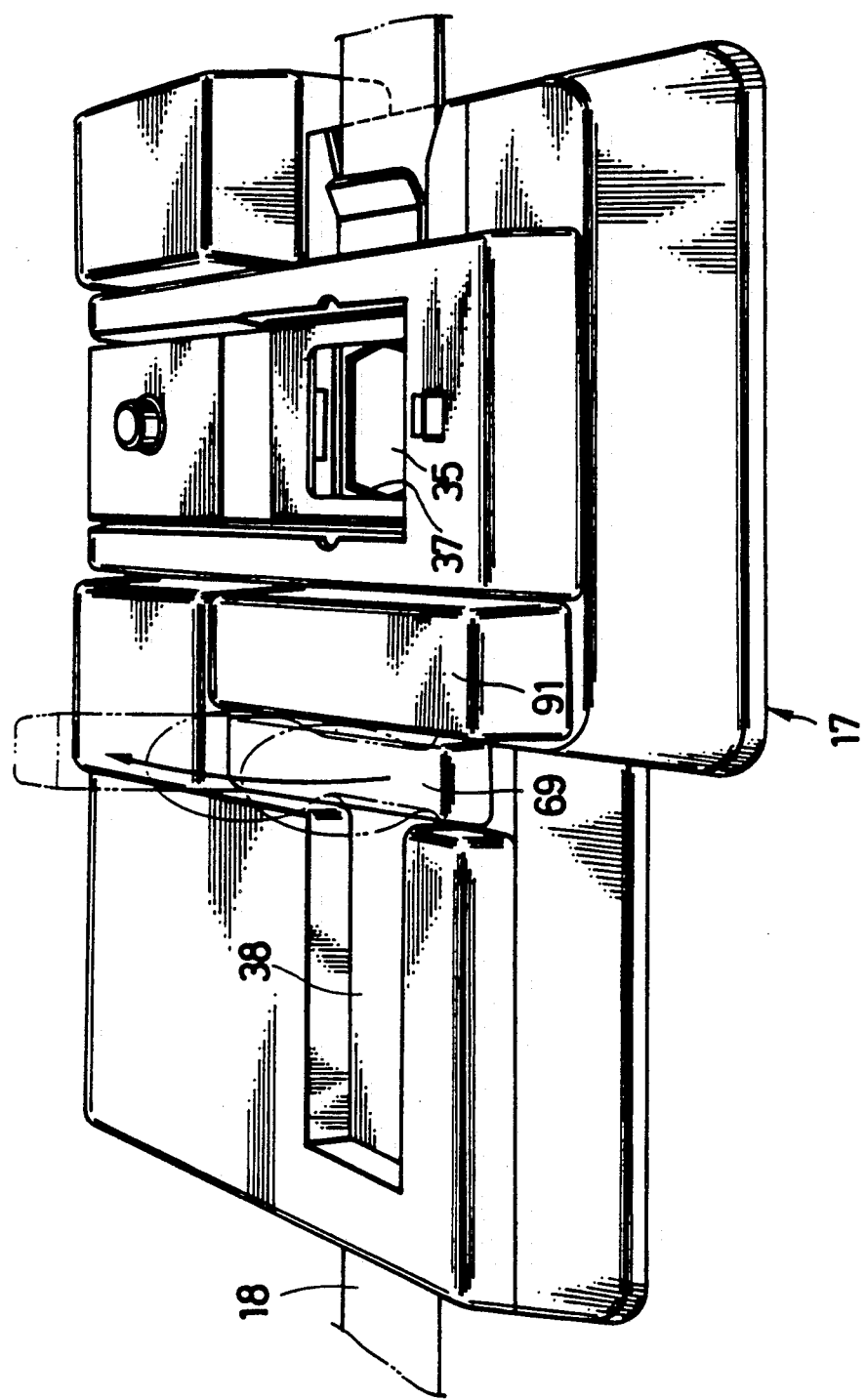
FIG. 2 is a perspective view of the film carrier shown in FIG. 1.

As shown in FIG. 2, the film viewing window 38 is disposed on the side of an entrance of the film exposing window 35. Below the film viewing window 38, there is an illumination lamp 60 and a diffusion plate 61 as shown in FIG. 1. The white light from the illumination lamp 60 illuminates a plurality of frames (for example, two) of the negative film 18 placed in the film viewing window 38. For more efficient observation, it is desirable to expose more than two frames of the negative film 18 in the film viewing window 38. Between the film viewing window 38 and film exposing window 35, there is a loop forming device 65 for voluntarily storing the negative film 18 in a loop. The loop forming device 65 consists of a guide plate 66 for making a loop of the negative film 18 upwardly; two pairs of rollers 67 and 68 disposed on both sides of the film viewing window 38 and of the film exposing window 35, respectively; a movable guide plate 69, disposed above the guide plate 66, for directing the leading end of the negative film 18 toward the pair of rollers 68 disposed between the loop forming device 65 and film exposing window 35; and a controller 70 for controlling rotation of the rollers 67 and 68.

After guiding the leading end of the negative film 18 toward the rollers 68, the movable guide plate 69 is swung up about a shaft 69A by a motor 69B so as to form a space wherein a loop of the negative film is formed. Although the loop is formed above the guide plate 66, it also may be formed below the guide plate 66. The respective rollers are driven by first and second pulse motors 71 and 72 whose rotations are controlled by the controller 70 through drivers 73 and 74, respectively. The negative film 18 may be transported by a belt conveyor in place of the rollers 67 and 68.

Figure 6:
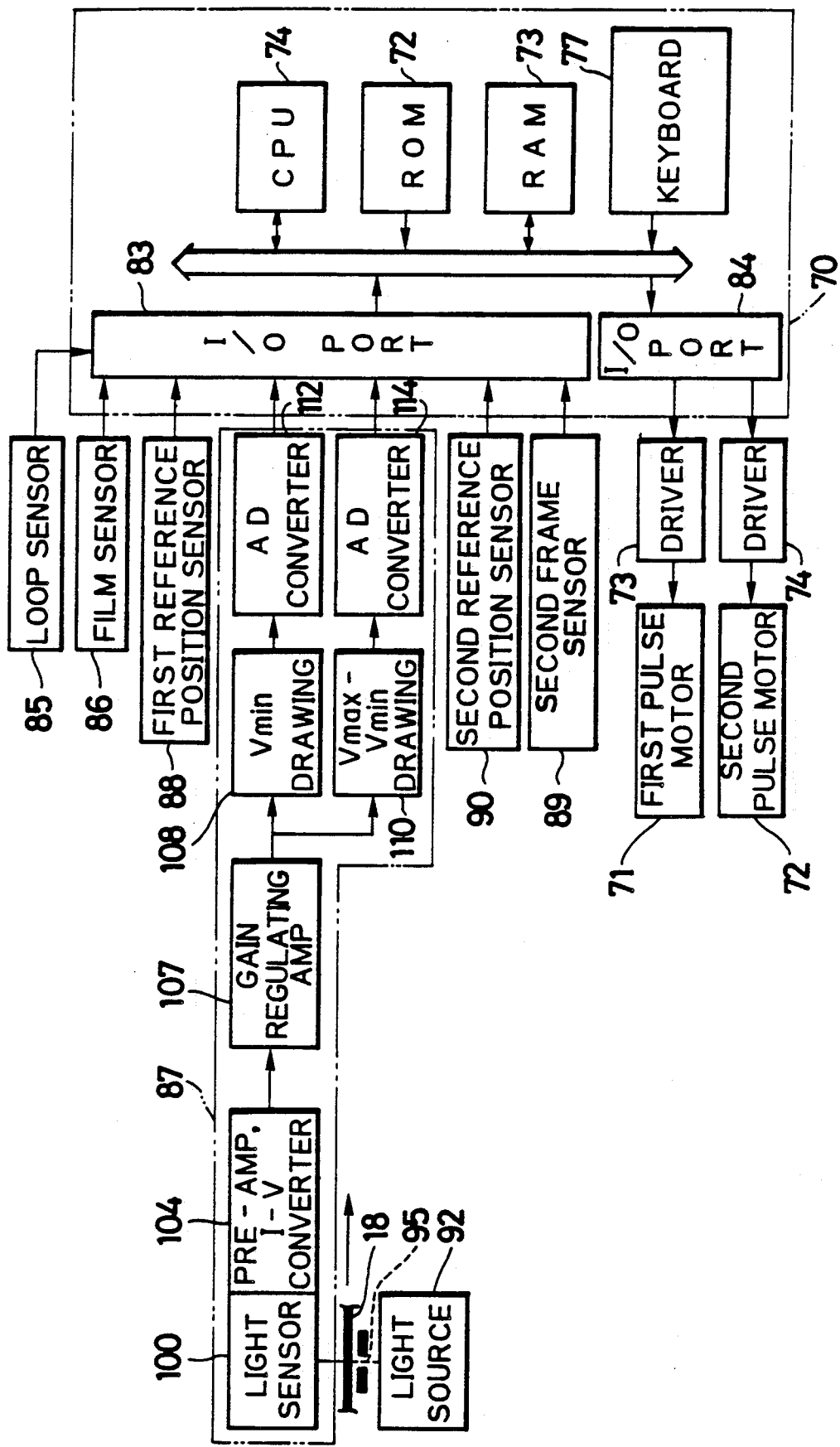
FIG. 6 is a block diagram of a controller and associated structure for detecting a frame of a film based on signals from a frame sensor.

As shown in FIG. 6, the controller 70, which is a general use microcomputer, performs automatic film forwarding control by means of a CPU in accordance with a control program stored in a ROM 72, data stored in a RAM 73, and outputs from various sensors. The controller 70 also controls various controlled devices, such as the filter driver 11 and the shutter driver 26 of the printer-processor. For control purposes, a keyboard 77 is provided with numerical and alphabetical keys 78 for entering various data, correction keys 79 for entering data of results of negative inspection, a frame forwarding key 80 for forwarding the negative film 18 frame by frame, a fine position regulating key 81 for finely positioning the negative film 18, and a start key 82. I/O ports 83 and 84 are connected to sensors and pulse motors.

Disposed close to, and on an upstream side of, the rollers 67 is a film sensor 86 of the type comprising a light emitting element and a light receiving element; a reflective type of photoelectric element; or a mechanical limit switch. Disposed close to, and on the side of the entrance of, the film viewing window 38 is a frame sensor 87 for detecting a front edge of a frame of the negative film 18 and providing a front edge signal to specify the frame, and a reference position sensor 88 for providing a reference signal which is used as a standard position to track the position of each frame. In this embodiment, the reference signal is provided when the front edge of the negative film 18 is detected.

When the front edge signal is provided from the frame sensor 87, the motor 71 is stopped, stopping the rotation of the rollers 67 so as to place the frame of the negative film 18 in position in the film viewing window 38. The reference position sensor 88, as well as the film sensor 86, which comprises a light projecting element and a light receiving element, provides the controller 70 with a reference signal, thereby actuating a counter contained in the controller 70 so as to count, for example, pulses applied to the first pulse motor 71 for the roller 67 and thereby to find the length by which the negative film 18 is transported.

Figure 3:
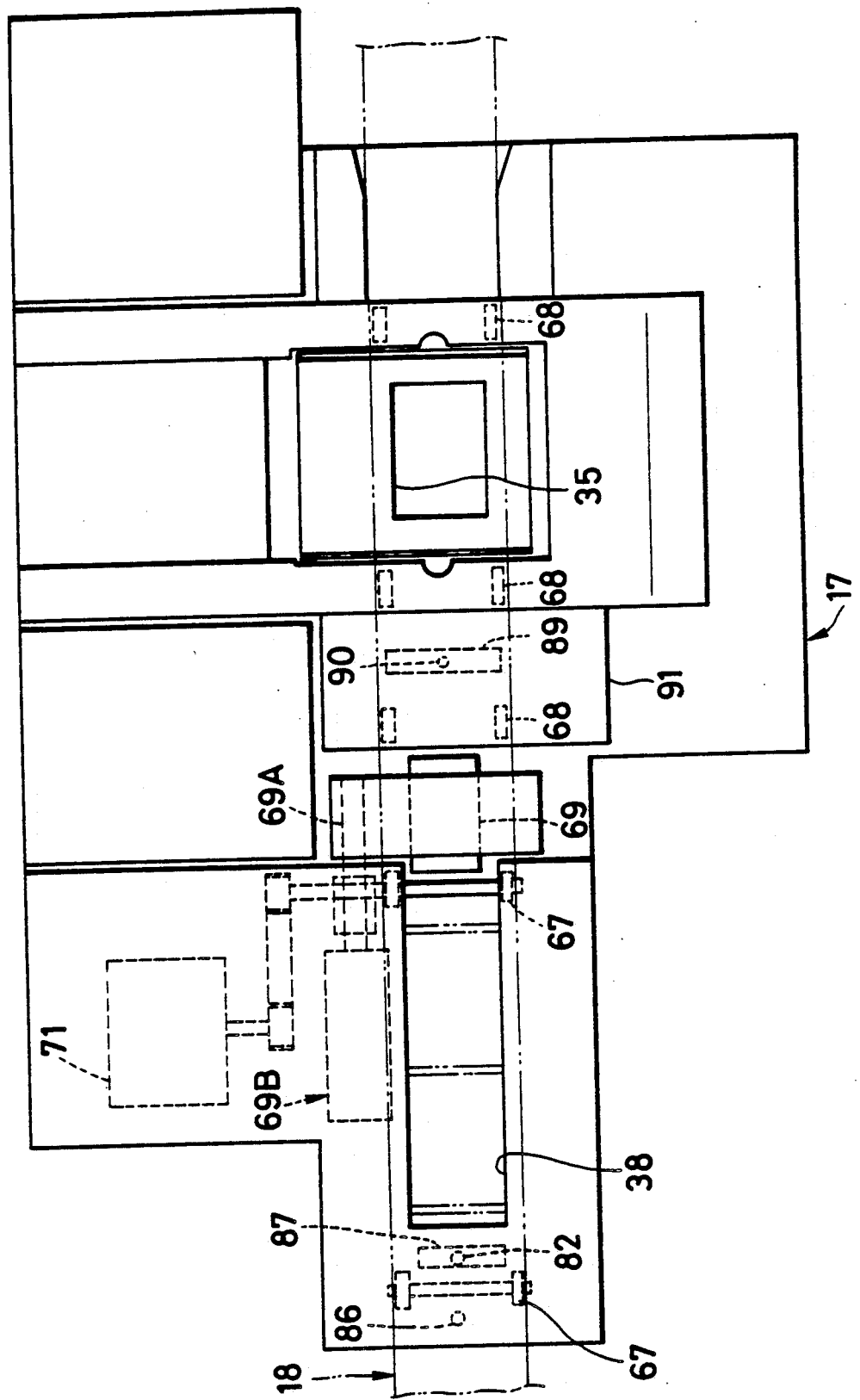
FIG. 3 is a plan view of the film carrier of FIG. 1.

Disposed close to, and on the side of the entrance of the film exposing window 35 are a frame sensor 89 and a reference position sensor 90, which have the same structure and operation as the frame sensor 87 and reference position sensor 88, for placing the frame of the negative film 18 in position in the film exposing window 35. As shown in FIG. 3, the sensors 89 and 90 are held by a sensor holder 91. When using position data of stored frames as well as the frame data resulting from inspecting the frames upon printing, the frame sensor 89 on the side of the entrance of the film exposing window 35 can be omitted.

FIG. 7 shows in detail the frame sensor 87 and reference position sensor 88, which have the same structure and operation as the frame sensor 89 and reference position sensor 90. Below the passage in which the negative film 18 moves, a light source 92 such as a cold cathode tube is disposed. Light from the light source 92 passes a slit 95 formed in a slit plate 94 and illuminates the negative film 18 from below. The slit plate 94 is fitted in an opening 96A of a fitting plate 96. The light passed through the negative film 18 is received by a light sensor 100 which comprises five stripe-shaped light receiving elements 102A-102E arranged in a transverse direction of the negative film 18 at regular spacings of about 2 mm on a glass plate 103 cemented to the back surface of an IC plate 101. A light receiving element 102F is disposed in the lengthwise direction of the negative film 18, adjacent the intermediate light receiving element 102C, and is used as a light receiving element of the reference position sensor 88. All the light receiving elements 102A-102F are amorphous silicon photosensors. Because amorphous silicon can form a large uniform film over a glass plate, it is relatively easy to form the stripe-shaped light receiving elements 102A-102F on the glass plate at regular spacings.

As was previously mentioned, each of the light receiving elements 102A-102F is in the form of a stripe extending in a transverse direction of the negative film 18 and about 2.4 mm long and about 0.1 to 0.5 mm wide, preferably about 0.2 mm, when used in association with a frame of a 135 type of roll film. Scanning lines La-Le along which the light receiving elements 102A-102E scans the negative film 18 are depicted in FIGS. 7 and 8. There may be fewer or more than five light receiving elements, preferably between 4 and 10. The IC plate 101 is attached to a fitting plate 105 with the glass plate 103 fitted in an opening 106 formed in the fitting plate 105 from the above.

On the IC plate 101, there is incorporated a preamplifying current-voltage (hereinafter referred to as a PAIV) converter circuit 104, shown in FIG. 6, for amplifying extremely small amounts of current from the light receiving elements 102A-102F and then converting them into voltages. The PAIV converter circuit 104 outputs a voltage signal to a gain regulating amplifier 107 for gain regulation. Thereafter, the voltage signal is sent to both first and second characteristic value drawing units 108 and 110 to draw out characteristic values $V_{min}$ and $V_{max} - V_{min}$ for frame specification. That is, the first characteristic value drawing unit 108 draws out a minimum value of voltage signals Va-Ve from the light receiving elements 102A-102E as the characteristic value $V_{min}$ and sends it to an A/D converter 112. Similarly, the second characteristic value drawing unit 110 draws out a maximum value of the voltage signals Va-Ve as the characteristic value $V_{max}$ to obtain $V_{max} - V_{min}$ and sends the result to an A/D converter 114. Signals transformed into a digital form by the A/D converters 112 and 114, respectively, are transmitted to the I/O port 83 of the controller 70.

FIGS. 8A-8I show voltage signals Va-Ve resulting from scanning a frame 18A of the negative film 18 by the light receiving elements 102A-102E, the characteristic values $V_{max}$, $V_{min}$ and $V_{max} - V_{min}$, and the negative film 18. As can be seen, the characteristic value $V_{min}$ is smaller in a frame 18A than in a margin 18B between each two frames 18A. Accordingly, the controller 70 can detect a front edge of a frame 18A, or a border between a frame 18A and a margin 18B adjacent to the frame 18A, by detecting a sharp change of the characteristic value $V_{min}$. The characteristic value $V_{max} - V_{min}$ significantly larger in a frame 18A and becomes nearly zero (0) in the margin 18B adjacent to the frame 18A. Accordingly, the controller 70 detects the front edge of frame 18A by detecting a characteristic value $V_{max} - V_{min}$ that is nearly zero (0). To detect the front edge of the frame 18A accurately, the controller 70 decides there is an edge only when there is a sharp change in both of the characteristic values $V_{min}$ and $V_{max} - V_{min}$ near zero (0).

To place a frame 18A of the negative film 18 in the film viewing window 38, the controller 70 actuates the pulse counter thereof to start counting pulses applied to the first pulse motor 71 at the time the reference position sensor 88 detects the leading end of the negative film 18. The count number of pulses is stored as film length data at the timing at which the frame sensor 87 provides a front edge signal. Based on the film length data, the negative film 18 is transported so as to place a frame 18A in position in the film viewing window 38. The negative film 18 is controlled to place a frame 18A in position in the film exposing window basically in the same manner as in the film viewing window 35.

Because the frame sensors 87 and 89 and reference position sensors 88 and 90 all have the same structure and operation, the first and second pulse motors 71 and 72, which have the same structure and operation, are controlled to drive the pairs of rollers 67 and 68 so as to place each frame 18A of the negative film 18. The frame 18A is placed in the same relative position in the film exposing window 35 as in the film viewing position 38. If the front edge of the frame 18A is not clear or sharp, the frame 18A of the negative film 18 is not always placed in the same relative position in the film exposing window 35 and film viewing window 38. Because film advancing mechanisms in the film exposing window 35 and film viewing window 38 have the same structure and operation, the deviation of relative position of the frame 18A is always the same in the film exposing window 35 and film viewing window 38.

If deviation of relative position occurs in the film viewing window 38, either one of the position regulating keys 81 of the keyboard 77 is operated to drive the first pulse motor 71 in a desired direction to correct the position of the negative film 18 in the film viewing window 38. The length of the negative film 18, moved correctively according to data input by the position regulating key 81, is detected from a direction of rotation of the first pulse motor 71 and the number of pulses applied to the first pulse motor 71. Data of the direction of rotation of the first pulse motor 71 and the number of pulses applied to the first pulse motor 71 is stored in an appropriate area of the RAM 73 for each frame 18A.

Figure 10:
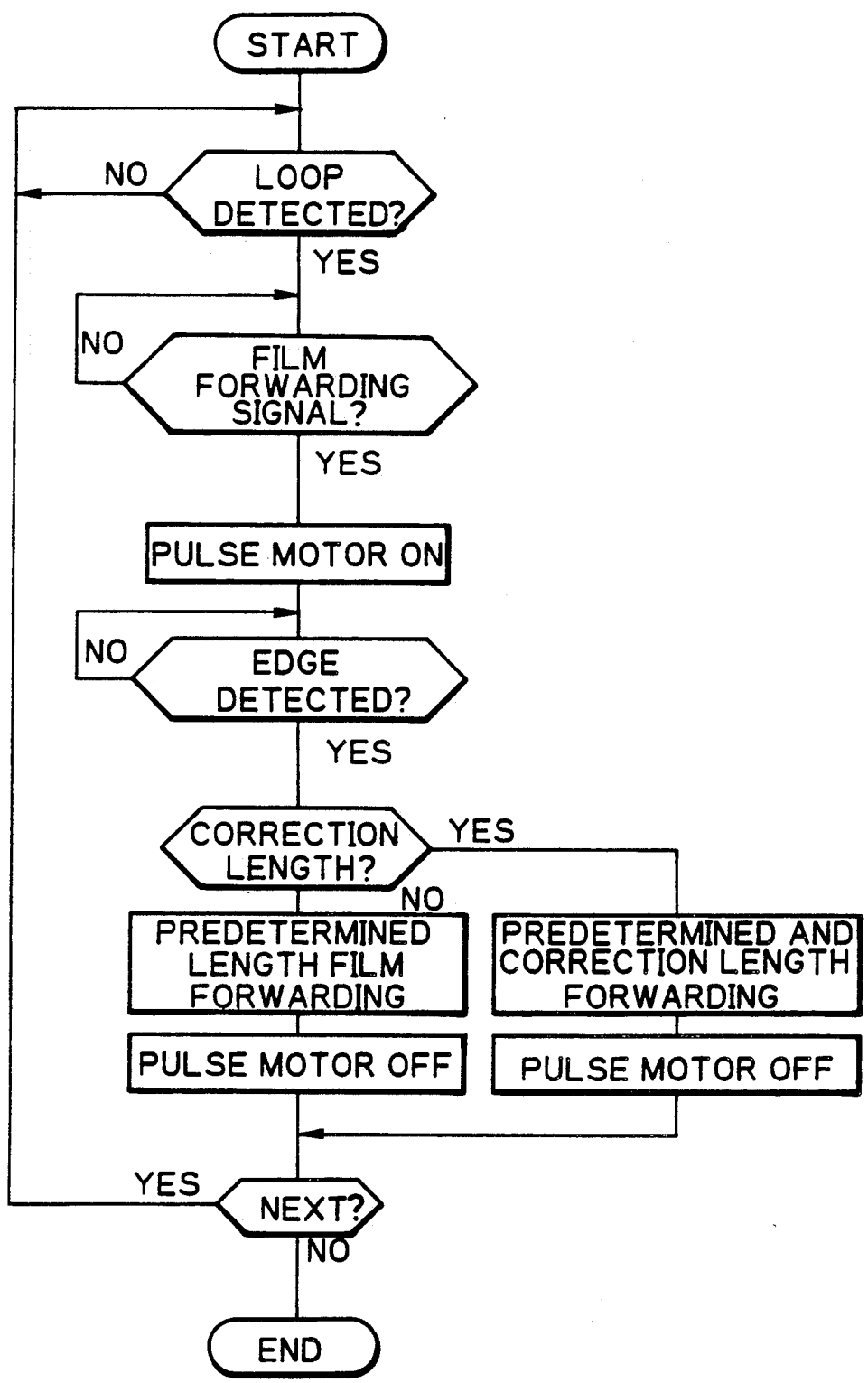
FIG. 10 is a flow chart showing a sequence for automatically a film in an exposing window.

To detect each frame 18A, front edge signals provided from the frame sensor 87 are counted to specify the respective frames 18A. For placing each frame 18A of the negative film 18 in the film exposing window 35, the RAM 73 is searched with the counted number of front edge signals to retrieve the data of the length by which the negative film is to be correctively moved so as to place the frame 18A automatically in position in the film exposing window 35. The sequences of operation of the placing of the film 18 in the film viewing window 38 and film exposing window are shown in FIGS. 9 and 10, respectively.

The operation of the printer processor with the film carrier apparatus 17 according to a preferred embodiment of the present invention now will be described in detail. When the negative film 18 is inserted into the entrance of the film viewing window 38 of the film carrier apparatus 17, the film sensor 86 is turned on, causing the rollers 67 ad 68 to rotate so as to transport the negative film 18 into the film viewing window 38. While the negative film 18 is transported, the reference point sensor 88 detects the leading end of the negative film 18 to reset the counter of the controller 70 and then cause the counter to count pulses applied to the first pulse motor 71. When the frame sensor 87 detects a front edge of a frame 18A of the negative film 18, the negative film 18 is stopped after a predetermined amount of movement thereof, so as to be placed in position in the film viewing window 38. If there is any deviation of position of the negative film 18 in the film viewing window 38, either one of the position regulating keys 81 is operated.

Because drive pulses provided during the operation of the position regulating key 81 are counted additively or subtractively according to the directions of rotation of the first pulse motor 71, it is possible to obtain accurate data for the position of the negative film 18 in the film viewing window 38. The counter of the controller 70 counts leading edge signals provided from the frame sensor 87, and specifies each frame 18A based on the counted number of edge signals. The position data of each frame 18A are stored in an appropriate area of the RAM 73 assigning the counted number as address data.

The operator observes a frame 18A of the negative film 18 in the film viewing window 38 for inspection. In this negative film inspection, because each frame 18A is scanned accurately by the scanner 31 to calculate automatically the exact correction data of exposure, it suffices to inspect the tendency of exposure of each frame roughly, for example, a subject failure, such as color failure or density failure and/or the kind of a principal subject image such as a human figure or a scene which the scanner 31 detects poorly. The result of the negative film inspection is input into the controller 70 through keys of the keyboard 77 and is stored in the RAM as well as the position data of each frame 18A.

In this manner, after negative film inspection has been carried out for an appropriate number of frames 18A, the negative film 18 is forwarded to the reference position sensor 90 on one side of the film exposing window 35 to turn it on. When the reference position sensor 90 is turned on, the controller 70 stops the second pulse motor 72 to stop the rollers 68 on both sides of the film exposing window 35, and stops the motor 69B to turn up the movable guide plate 69. As a result, the movable guide plate 69 forms a space above the guide plate 66 where a loop of the negative film 18 is created, either a loop sensor 85 detects the negative film 18 or the start key is operated by the operator to start the printer processor to print.

After having been formed in a loop at the loop forming device 65, the negative film 18 is transported into the film exposing window 35 and is placed in position in the film exposing window 35 based on the front edge signal, leading end signal from the reference position sensor 90 and corrective position data input at the film viewing window 38. That is, the controller 70 specifies each frame 18A based on the counted number of front edge signals provided from the frame sensor 89 on the side of the film exposing window 35. The counted number in the RAM 73 is searched to retrieve the corrective position data with data of the counted number of front edge signals.

In this manner, the controller 70 judges whether the frame 18A of the negative film 18 in the film exposing window 35 is the frame for which the corrective position data is retrieved. If the negative film must be moved correctively in the film exposing window 35, the negative film 18 is transported by a length which is the sum of the predetermined length and a corrective length. On the other hand, if no corrective movement of the negative film 18 is required, the negative film 18 is transported by the predetermined length. In this manner, the negative film 18 is positioned in the film exposing window 35.

After a frame 18A of the negative film 18 is placed in the film exposing window 35, the frame is scanned by the scanner 31 to calculate an exposure for the frame based on the result of the previous inspection and the present scanning. The controller 70 controls the filter driver 11 and shutter driver 26 to effect exposure according to the calculation result, thereby creating a latent image of the frame 18A on the color paper 21. When an unexposed part of the color paper 21 is positioned in the paper framing mask 39 after printing, the controller 70 controls the printer processor in the same manner to expose frames 18A and create latent images of the respective frames 18A in the color paper 21 one by one. The exposed part of the color film 21 is transferred into the photographic processor 29 for development.

Figure 11:
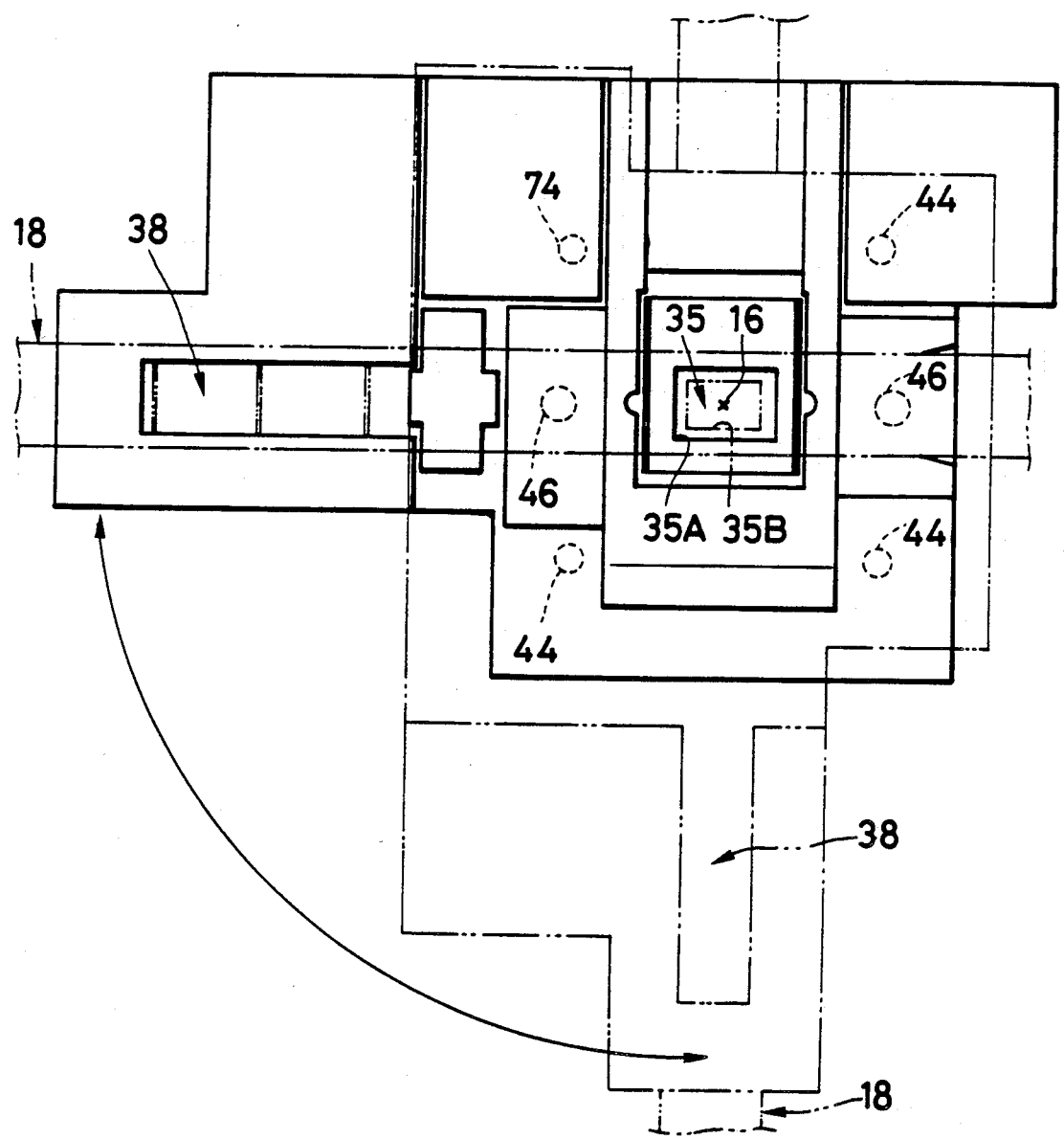
FIG. 11 is a plan view showing the film carrier turned through by the turntable unit.

When processing the half size of negative films in place of the 135 type of negative films, the film carrier apparatus 17 is turned counterclockwise about the printing axis 16, as shown in FIG. 11. As a result, the turntable 43 turns through 90°, riding over the click stop positioning balls 44 received in the base table 42, until the click stop positioning balls 44 are received in the conical recesses 51, thereby replacing an opening 35A of the film framing mask 36 of the film carrier apparatus 17, suitable for the full size of negative film, with an opening 35B suitable for a half size of negative films. At this time, the printing lens either is changed in focal length or is replaced with another printing lens having a different focal length so as to make prints from the half size of negative film as large as prints made from the full size of negative film. Otherwise, as described in Japanese Patent Publication No. 61(1986)-5135, it may be convenient to use a variable opening film carrier with an opening which is variable in size according to the rotational position of the film carrier.

The film carrier apparatus 17, which is formed with both film viewing window 38 and film exposing window 35 as described above, may be replaced with film carriers 123 and 124 formed with a film exposing window 120 and film viewing window 121, respectively, as shown in FIG. 12. The negative film 18 is placed in position in the film viewing window 121 by a pair of rollers 127 driven by a motor 125 through a timing belt 126. A movable guide plate 128 is disposed on the side of the film carrier 124 between the film carriers 123 and 124 for directing the leading end of the negative film 18 toward the film carrier 123 on the side of the film exposing window 120. The movable guide plate 128 is swung up after directing the leading end of the negative film 18 toward the second film carrier 123, so as to form a loop of the negative film 18 between the film carriers 123 and 124. The film carrier 124 with the film viewing window 121 can be provided beside the existing film carrier 123 with an exposing window installed in an existing printer processor, so as to improve the existing printer processor in efficiency without modifying the same.

Although, in any above described embodiment, the film viewing window 38 or 121 is so formed as to have a width twice as large as the width of the frame, it also may be equal to the width of the frame or three times as large as the width of the frame.

If an accurate negative film inspection is made as performed conventionally, the scanner 31 can be replaced with a light measuring device such as a Cds to calculate an exposure based on a large area transmittance density (LATD).

Although the present invention has been fully described with reference to preferred embodiments thereof as shown in the accompanying drawings, the invention is not so limited unless otherwise specified. Various modifications within the spirit of the invention will be apparent to those of working skill in this technological field. Thus, the scope of the invention should be construed in accordance with the accompanying claims.

What is claimed is:

1. A photographic film carrier attached to a photographic printer for defining a film exposing window in which frames of a negative film are placed to expose each frame to create a latent image on a photographic paper, said photographic film carrier comprising:
a film viewing window, formed close to said film exposing window in said photographic film carrier, for allowing an operator to inspect each said frame positioned therein for exposure; and
looping means, disposed between said film viewing window and film exposing window, for forming a loop in said negative film between said film viewing window and said film exposing window, said looping means comprising:
a guide plate;

a pair of rollers, disposed adjacent to each of said film viewing window and film exposing window, for forming a loop in said negative film above said guide plate;

a movable guide plate, disposed on said guide plate, for guiding a leading end of said negative film to said pair of rollers provided in association with said film viewing window, said movable guide plate then being swung up for forming a space above said guide plate wherein a loop is formed; and control means for controlling rotation of said pairs of rollers provided in association with said film viewing window and film exposing window.

2. A photographic film carrier as defined in claim 1, and further comprising first and second film forwarding means provided separately with said film viewing window and film exposing window, respectively, for positioning each said frame in said film viewing window and film exposing window, respectively.

3. A photographic film carrier as defined in claim 2, wherein said film exposing window, said film viewing window and said looping means are all provided integrally with said photographic film carrier.

4. A photographic film carrier as defined in claim 3, and further comprising turning means for supporting said photographic film carrier for rotational movement through 90° about an axis passing through a center of said film exposing window, so as to direct said film viewing window toward said operator.

5. A photographic film carrier attached to a photographic printer for defining a film exposing window in which frames of a negative film are placed to expose each frame to create a latent image on a photographic paper, said photographic film carrier comprising:

a film viewing window, formed close to said film exposing window in said photographic film carrier, for allowing an operator to inspect each said frame positioned therein for exposure;

looping means, disposed between said film viewing window and film exposing window, for forming a loop in said negative film between said film viewing window and said film exposing window;

first and second frame sensors disposed close to, and on upstream sides of, said film viewing window and film exposing window, respectively, for detecting a front edge of each said frame, said first and second frame sensors having the same structure and operation;

first and second film forwarding means provided separately with said film viewing window and film exposing window, respectively, for automatically positioning each said frame in position in said film viewing window and said film exposing window based on respective outputs from said first and second frame sensors, said first and second film forwarding means having the same structure operation;

input means for inputting correction data for each of said frames forwarded by said first film forwarding means in position in said film viewing window based on visual inspection of each of said frames by said operator;

position correcting means for correcting a position of each of said frames in said film viewing window according to said data input through said input means; and second positioning means for storing said data from said input means and correcting said position of each of said frames in said film exposure window according to said date and an output from said second frame sensor.

6. A photographic film carrier as defined in claim 1, wherein said film viewing window has an opening having a size sufficient to inspect simultaneously two frames therethrough.

7. A photographic film carrier as defined in claim 6, wherein said photographic printer includes a light source and a diffusion plate near said film viewing window for diffusing and directing light from said light source to said negative film placed in said film viewing window.

8. A photographic film carrier as defined in claim 2, wherein said film viewing window has an opening having a size sufficient to inspect simultaneously two frames therethrough.

9. A photographic film carrier as defined in claim 8 wherein said photographic printer includes a light source and a diffusion plate near said film viewing window for diffusing and directing light from said light source to said negative film placed in said film viewing window.

10. A photographic film carrier as defined in claim 3, wherein said film viewing window has an opening having a size sufficient to inspect simultaneously two frames therethrough.

11. A photographic film carrier as defined in claim 10 wherein said photographic printer includes a light source and a diffusion plate near said film viewing window for diffusing and directing light from said light source to said negative film placed in said film viewing window.

12. A photographic film carrier as defined in claim 4, wherein said film viewing window has an opening having a size sufficient to inspect simultaneously two frames therethrough.

13. A photographic film carrier as defined in claim 12, wherein said photographic printer includes a light source and a diffusion plate near said film viewing window for diffusing and directing light from said light source to said negative film placed in said film viewing window.

14. A photographic film carrier as defined in claim 5, wherein said film viewing window has an opening having a size sufficient to inspect simultaneously two frames therethrough.

15. A photographic film carrier as defined in claim 14, wherein said photographic printer includes a light source and a diffusion plate near said film viewing window for diffusing and directing light from said light source to said negative film placed in said film viewing window.

16. A photographic film carrier as defined in claim 15, wherein said looping means comprises:

a guide plate;

a pair of rollers, disposed adjacent to each of said film viewing window and film exposing window, for forming a loop in said negative film above said guide plate;

a movable guide plate, disposed on said guide plate, for guiding a leading end of said negative film to said pair of rollers provided in association with said film viewing window, said movable guide plate then being swung up for forming a space above said guide plate wherein a loop is formed; and control means for controlling rotation of said pairs of rollers provided in association with said film viewing window and film exposing window.

17. A photographic film carrier as defined in claim 5, wherein each said frame sensor comprises at least four light receiving elements arranged separately perpendicular to a direction in which said negative film is forwarded for providing voltage outputs, respectively, maximum and minimum voltage outputs $V_{max}$ and $V_{min}$ being drawn among said voltage outputs so as to obtain a voltage difference therebetween for detecting a front edge of each said frame based on changes of said minimum voltage output $V_{min}$ and said voltage difference.

18. A photographic film carrier as defined in claim 17, wherein said light receiving elements are about 2.4 mm long and 0.2 mm wide.

19. A photographic film carrier as defined in claim 5, wherein said turning means comprises a base positioned relative to said printer, a turntable attached to said photographic and mounted on said base for rotational movement, and a click stop means, disposed between said base and turntable, for locating said turntable in two positions separated by approximately 90°.

20. A photographic film carrier as defined in claim 19, wherein said click stop means comprises a plurality of positioning balls received in a semispherical recess formed in said base, and a plurality of recesses, formed in said turntable, for receiving said positioning balls when said turntable turns 90° relative to said base.

* * * * *